United States Patent [19]
Watts

[11] 3,974,870
[45] Aug. 17, 1976

[54] TIRE WITH UNEQUAL BEAD DIAMETERS

[75] Inventor: George T. Watts, North Canton, Ohio

[73] Assignee: The Goodyear Tire & Rubber Company, Akron, Ohio

[22] Filed: May 28, 1974

[21] Appl. No.: 473,648

[52] U.S. Cl. ...................... 152/352 R; 152/361 R; 152/DIG. 6
[51] Int. Cl.² ...................... B60C 3/00; B60C 13/00
[58] Field of Search ........... 152/361 R, DIG. 6, 352, 152/353

[56] References Cited
UNITED STATES PATENTS

| | | | |
|---|---|---|---|
| 2,028,702 | 1/1936 | Hale | 152/DIG. 6 |
| 3,589,424 | 6/1971 | Sasaki | 152/361 R |
| 3,842,882 | 10/1974 | Gough et al. | 152/DIG. 6 |

FOREIGN PATENTS OR APPLICATIONS

| | | | |
|---|---|---|---|
| 849,466 | 11/1939 | France | 152/DIG. 6 |

*Primary Examiner*—Drayton E. Hoffman
*Attorney, Agent, or Firm*—F. W. Brunner; H. E. Hummer

[57] ABSTRACT

A tire with conventional components having a pair of annular beads with different diameters, and contour lengths which are substantially equal. The contour lengths are referenced to the sidewalls of the tire and are measured along the neutral axis of the carcass plies between the beads and a plane containing the mid-circumferential centerline of the tread.

5 Claims, 1 Drawing Figure

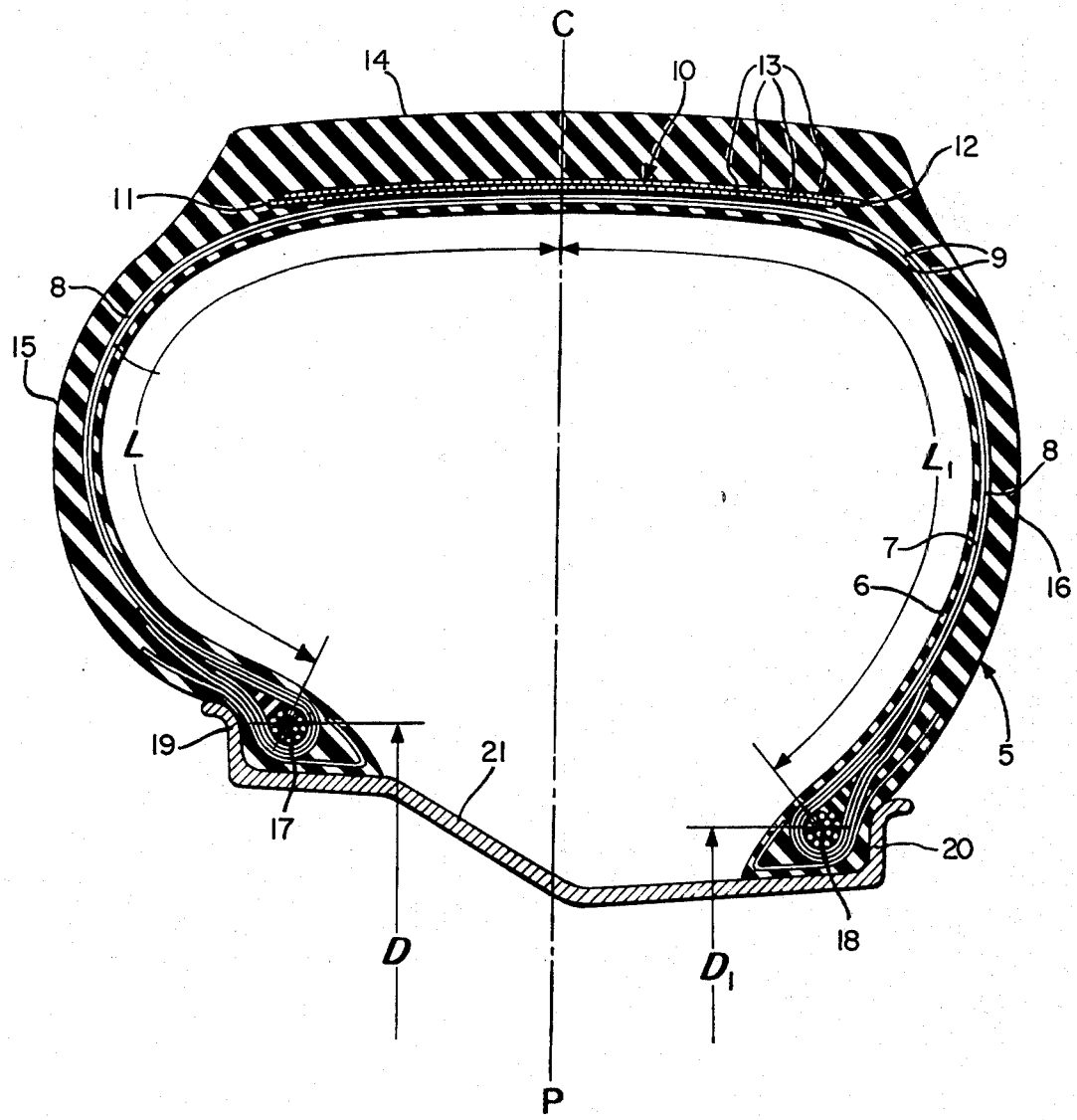

TIRE WITH UNEQUAL BEAD DIAMETERS

BACKGROUND OF THE INVENTION

The invention relates to tires having unequal bead diameters as shown and described in, for example, U.S. Pat. Nos. 2,018,597; 2,108,329; and British Pat. No. 1,275,409. The invention is directed to providing a tire of this type with improved lateral stability.

Briefly stated, the invention is in a tire having a pair of annular beads with unequal bead diameters. The contour lengths of the sidewalls of the tire are made as nearly equal as possible. The contour lengths are measured along the neutral axis of the carcass plies between the center axis of the beads and a plane CP containing the mid-circumferential centerline of the tread, such plane herein referred to as the centerplane.

DESCRIPTION OF THE DRAWING

The following description of the invention will be better understood by having reference to the drawing which is a section of a tire made in accordance with the invention and illustrated in an inflated condition on a wheel rim, also shown in section.

ENVIRONMENT OF THE INVENTION

Referring to the drawing, there is shown a tire 5 comprising the essential components of: a fluid impervious innerliner 6; a plurality of carcass plies 7 and 8, each of which include parallel reinforcement cords 9; a belt structure 10, including a pair of superimposed belts 11 and 12, each of which have parallel reinforcement cords 13; and a tread 14 and pair of sidewalls 15 and 16 surrounding the carcass plies 7, 8 and terminating at a pair of inner and outer annular beads 17 and 18 designed for seating engagement against adjacent outstanding flanges 19 and 20 of a wheel rim 21 on which the tire 5 is mounted.

The tire 5 is preferably a radial-type tire where the reinforcement cords 9 of the carcass plies 7 and 8 are radially oriented, i.e. they are disposed at angles in the range of from 75° to 90° measured from the centerplane, although the invention may be utilized in bias, or bias-belted type tires where the same carcass reinforcement cords 9 are disposed at angles in the range of from 28 to 48° measured relative to the centerplane. The reinforcement cords 13 of the belt structure 10 of a radial tire are disposed at angles in the range of from 0° to 30°, whereas the same belt cords 13 of a bias-belted tire are disposed at angles in the same range as the cords of the carcass plies, except that the angular disposition of the belt cords 13 is usually at least 1° to 2° lower than correspondingly measured cord angles of the carcass plies.

The annular beads 17 and 18 of tire 5 have unequal diameters D and $D_1$. The diameter D of each inner bead 7, in this instance, is greater than the correspondingly measured diameter $D_1$ of each outer bead 18 to provide greater space for larger braking mechanisms, since the terms "inner" and "outer" are in reference to the location of the beads 17 and 18 relative to an automobile on which the tire 5 is mounted, the inner beads 17 being closest the tire on the opposite side of the same automobile axle, and the outer beads 18 facing outwardly from the automobile. In other instances, it may be more desirable that the outer beads 18 have larger diameters, especially to change the esthetic appearance of the tire. From the standpoint of the handling and wear characteristics of a passenger tire, best results are achieved by not varying the diameters D and $D_1$ of the inner and outer beads 17 and 18 more than two inches. It is theorized, however, that the bead diameters D and $D_1$, of larger truck tires could vary by more than this amount, e.g. 3 to 6 inches.

THE INVENTION

The contour lengths L and $L_1$ are referenced to the sidewalls 15 and 16 and are substantially equal, i.e. they are preferably made as nearly equal as possible under the conditions of building and molding a tire. The contour lengths L and $L_1$ are measured along the neutral axis of the carcass plies 7 and 8 between the center axis of the beads 17 and 18, as shown, and the centerplane of the tire 5. The "neutral axis" is an axis midway between the total number of carcass plies which, in this case, is midway between the two carcass plies 7 and 8. In the case of a single ply tire, the neutral axis would bisect the single ply.

The mold in which the tire 5 is shaped, is designed to produce identical contour lengths L and $L_1$. Such a mold is described in a copending application Ser. No. 473,647 filed the same day. However, these lengths may vary slightly due to uneven gauge of rubber stock around the tire and because of minor inaccuracies in building and molding a tire. The contour lengths L and $L_1$ should, preferably, not vary by more than 1½ percent from the designed contour lengths, and tires 5 have been produced with contour lengths that do not vary by more than .1 inches. It should be appreciated that lengths, correlated to the contour lengths, can be measured along the outer surfaces of the tire 5, providing there are equal amounts of tire building material on both sides of the centerplane and outside the neutral axis, so long as the measurements are made between the centerplane of the tire and identical points in the areas of the inner and outer beads 17 and 18. It is desirable that the centerplane of the tire 5 coincide with the centerplane of the wheel rim 21 when the tire 5 is mounted on the wheel rim 21 and inflated. Any measurements of the contour lengths L and $L_1$ are made when the tire 5 is mounted on a wheel rim 21 and inflated to a normal inflation pressure, as recommended by the manufacturer of the tire.

Thus, there has been provided a tire with unequal bead diameters and equal contour lengths, which is different from those shown in the aforementioned patents, as having unequal bead diameters, but different contour lengths. A passenger tire with an inner bead diameter of 17 inches and an outer bead diameter of 15 inches was constructed, tested, and found to have good lateral stability, especially when cornering, i.e. rounding a corner. The spring characteristics of the tire were also found to be excellent, such that there was no apparent loss in riding comfort.

What is claimed is:

1. A tire comprising at least one carcass ply, a tread and pair of sidewalls surrounding the carcass ply and terminating at a pair of annular beads of different diameters, and characterized in that the contour lengths (L) and ($L_1$) of the sidewalls, measured along the neutral axis of the carcass plies between the center axes of the beads and centerplane of the tire, are equal.

2. The tire of claim 1, further characterized in that the diameters of the beads differ by not more than 2 inches.

3. The tire of claim 1, further characterized in that the carcass ply is reinforced by parallel cords disposed at angles in the range of from 75° to 90° measured from the centerplane, and by a belt structure which is disposed between the tread and any carcass plies and reinforced by parallel cords disposed at angles in the range of from 0° to 30°, also measured from the centerplane.

4. The tire of claim 1, further characterized in that the carcass ply is reinforced by parallel cords which are disposed at angles in the range of from 28° to 40° measured from the centerplane.

5. The tire of claim 4, further characterized by a belt structure between the tread and any carcass plies, the belt structure including reinforcement cords disposed at angles which are lower than correspondingly measured angles of the cords of the carcass plies, the reinforcement cords of the belt structure also being disposed at angles in the range of from 28 to 40° measured from the centerplane.

* * * * *